United States Patent
Lion et al.

(10) Patent No.: US 7,850,035 B2
(45) Date of Patent: Dec. 14, 2010

(54) BAKING SHEET

(75) Inventors: Mathieu Lion, Paris (FR); Lucas Bignon, Cachan (FR)

(73) Assignee: Mastrad SA, Paris (FR)

( * ) Notice: Subject to any disclaimer, the term of this patent is extended or adjusted under 35 U.S.C. 154(b) by 424 days.

(21) Appl. No.: 10/883,348

(22) Filed: Jul. 1, 2004

(65) Prior Publication Data

US 2006/0000367 A1 Jan. 5, 2006

(51) Int. Cl.
*A47J 27/00* (2006.01)
*B65D 30/10* (2006.01)
*B65D 8/08* (2006.01)

(52) U.S. Cl. .................. 220/573.1; 220/9.1; 220/647

(58) Field of Classification Search .......... 220/573.1–3, 220/9.1–9.4, 475, 647; 99/426
See application file for complete search history.

(56) References Cited

U.S. PATENT DOCUMENTS

| | | | |
|---|---|---|---|
| 3,804,965 A | 4/1974 | Peters | |
| 3,962,961 A * | 6/1976 | Peters | 99/426 |
| 4,565,468 A | 1/1986 | Crawford | |
| 4,960,211 A | 10/1990 | Bailey | |
| 5,209,957 A | 5/1993 | Lin et al. | |
| 5,232,609 A * | 8/1993 | Badinier et al. | 249/102 |
| 5,503,062 A | 4/1996 | Buff, IV | |
| 5,601,012 A * | 2/1997 | Ellner | 99/428 |
| 5,968,577 A * | 10/1999 | Roecker | 426/523 |
| 6,067,698 A * | 5/2000 | Silvera-Langley | 29/428 |
| 6,279,771 B1 | 8/2001 | Bryant | |
| 7,011,014 B2 * | 3/2006 | Siegel et al. | 99/422 |
| 7,150,221 B2 * | 12/2006 | Morgan | 99/428 |
| 2001/0004056 A1 * | 6/2001 | Sawyer | 206/503 |
| 2001/0043977 A1 * | 11/2001 | Llorente Hompanera | 426/523 |
| 2002/0100372 A1 | 8/2002 | Bryant et al. | |
| 2003/0192847 A1 * | 10/2003 | Jahrling et al. | 211/175 |
| 2005/0000960 A1 | 1/2005 | Bergeret | |
| 2005/0056642 A1 | 3/2005 | Lion | |
| 2005/0082286 A1 * | 4/2005 | Nikkhah | 220/9.1 |
| 2005/0199132 A1 * | 9/2005 | Meeks et al. | 99/426 |

FOREIGN PATENT DOCUMENTS

| | | |
|---|---|---|
| DE | 0038325243 | 3/1999 |
| EP | 000278055 | 8/1988 |
| GB | 002154860 | 9/1985 |
| JP | 02002264548 | 9/2002 |

OTHER PUBLICATIONS

The above references were cited in an Aug. 6, 2008 US Office that Action issued in related U.S. Appl. No. 11/157,747, which is enclosed.

* cited by examiner

*Primary Examiner*—Anthony Stashick
*Assistant Examiner*—Shawn M Braden
(74) *Attorney, Agent, or Firm*—Cowan, Liebowitz & Latman, P.C.; Mark Montague, Esq.

(57) ABSTRACT

A baking sheet having a substantially flat silicone cooking surface, two rods extending along and coupled to opposite sides of the cooking surface, and two thermo-resistant handles coupled to and extending between the two rods. The thermo-resistant handles may be connected to the rods using thermo-resistant connectors. The connectors can disconnect from the rods and possibly be rotated to rotate the handles in positions adjacent to the rods to enable the baking sheet to be rolled into storage. The thermo-resistant characteristic of the handles enables users to lift the heated baking sheet without the use of oven mitts or other protective device.

26 Claims, 6 Drawing Sheets

BAKING SHEET

FIELD OF THE INVENTION

The present invention relates to a baking sheet and, more particularly, to a silicone baking sheet with removable thermo-resistant handles for easy handling and convenient storage.

BACKGROUND OF THE INVENTION

Baking sheets have long been widely and commonly used for supporting food products such as pre-baked food during the baking process. Patented designs include those disclosed in U.S. Pat. No. 6,279,771; and those in foreign Patents GB 2,154,860; EP 278055; DE 3832524.

Traditional baking sheets, however, pose handling problems after being exposed to high temperatures since they do not permit direct contact. In addition, with traditional baking sheets it is very difficult to place the sheet in an oven when it has cookie dough on it. In such case, the user generally must use a griddle or a metal tray. Many of the above references disclose enhanced baking sheets, for instance baking sheets adaptable to different widths, having an air pocket between the food product and the baking sheet, or eliminating the need for greasing the surface prior to baking. Nevertheless, there still is a need for a baking sheet enhanced to allow easy handling immediately following exposure to high temperatures as well as proper storage. There also is the need for a baking sheet that can be easily partially or completely removed from an oven for various purposes, such as to monitor baking status.

OBJECTS AND SUMMARY OF THE INVENTION

It is therefore an object of the present invention to provide a baking sheet enhanced for easy handling before, during and after exposure to high temperatures.

It is a further object of the present invention to provide a self-supported baking sheet allowing for quick disassembly and easy storage.

In accordance with the present invention, a baking sheet includes a cooking surface, first and second rods coupled to the cooking surface, and first and second thermo-resistant handles coupled to the first and second rods.

As a feature of the invention, the first and second rods are coupled to opposite ends of the cooking surface, and each of the first and second thermo-resistant handles is coupled to respective ends of the first and second rods.

As another feature of the invention, the cooking surface is substantially flat and made of silicone. The cooking surface may also be a sheet of metal.

As a further feature of the invention, each rod is encircled by the silicone cooking surface at respective opposite ends of the silicone cooking surface.

As yet a further feature, the ends of the two rods are exposed and the handles are coupled to the exposed ends of the rods.

As yet another feature, the two rods are made of thermo-resistant material.

As yet an additional feature, connectors attach the handles to the rods. The connectors may be rotatable to allow the handles to be moved adjacent to the rods to allow easy storage. The connectors may be thermo-resistant. The connectors may also be detachable to allow complete disassembly of the components.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

The present invention pertains to a novel baking sheet. As would be appreciated, the inventive baking sheet is intended for use by a layperson or a professional chef for the purpose of assisting in the baking of food products. Of course, the baking sheet may be utilized by other individuals for similar or different purposes.

Figure 1:
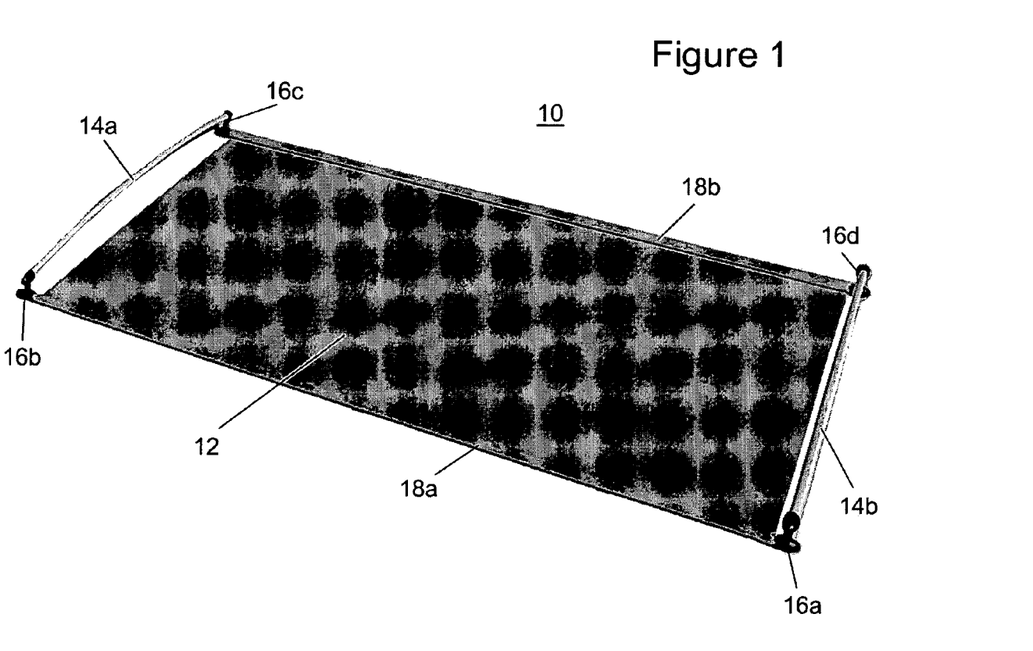
FIG. 1 is a schematic illustration of the baking sheet of the present invention.

Referring now to FIG. 1 of the drawings, the baking sheet 10 of the present invention includes a cooking surface 12 and a pair of handles 14a and 14b. Cooking surface 12 preferably is flat and made of silicone. However, cooking surface 12 may be made of other material, such as from a suitable metal sheet, coated or uncoated, appropriate for cooking functions. Handles 14a and 14b may be made of metal, but preferably are made of thermo-resistant material, so as to allow direct handling immediately after exposure to extreme temperatures, for example, after baking. Handles 14a and 14b may be completely straight or be slightly curved to provide tensile strength to the silicone sheet. Handles 14a and 14b are attached to the shorter sides of cooking surface 12 utilizing four sets of connectors 16a, 16b, 16c and 16d (an individual connector is sometimes referred to herein, for convenience, as connector 16).

Figure 2A:
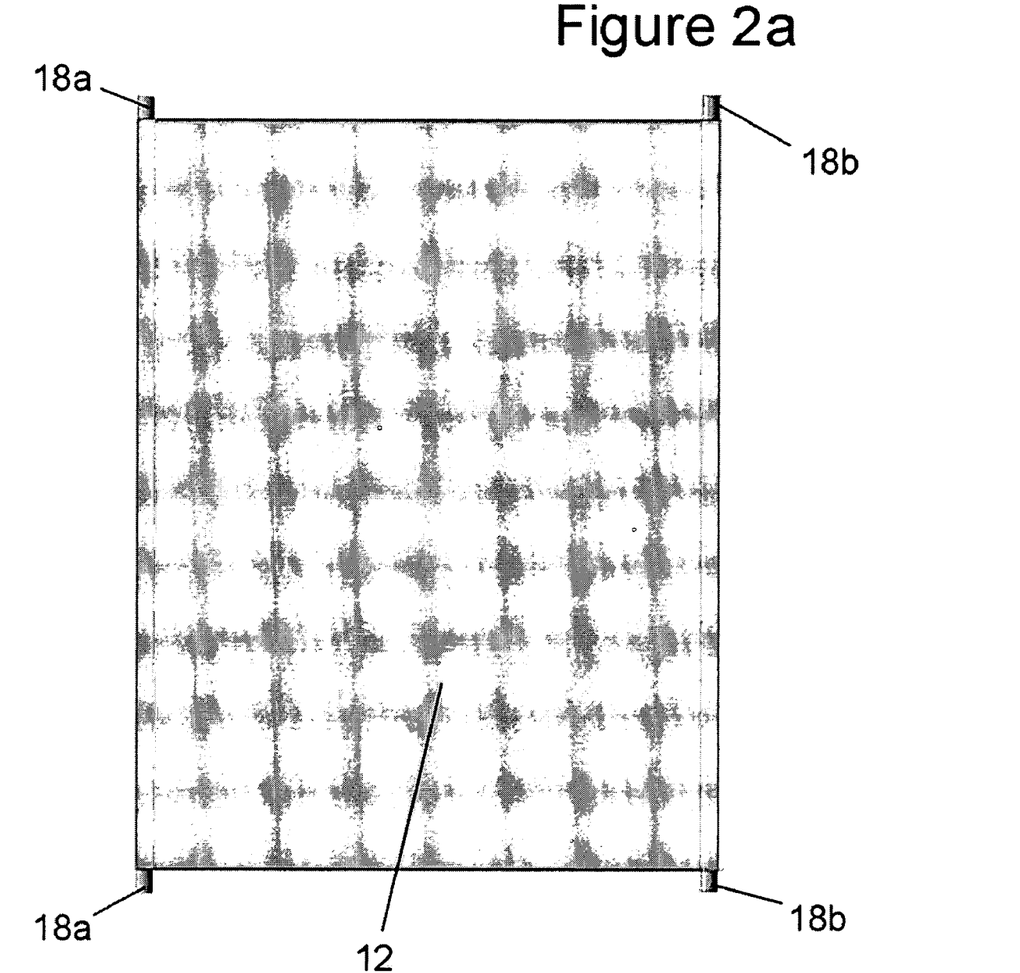
FIGS. 2a and 2b show different views of the baking sheet's cooking surface with attached rods.
Figure 2B:
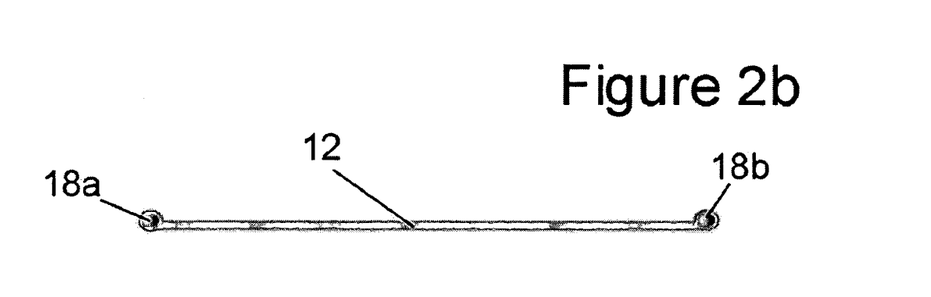

Cooking surface 12 includes a pair of rods 18a and 18b, disposed along the longer sides, as shown in the respective top and side view drawings of FIGS. 2a and 2b. Rods 18a and 18b may be made of stainless steel or other appropriate material, but preferably are made of thermo-resistant material. In the preferred embodiment, cooking surface 12 is made of silicone and rods 18a and 18b are encircled within the silicone (see FIG. 2b) along the two longer surfaces of cooking surface 12. Rods 18a and 18b extend slightly beyond the encircled silicone and, as discussed further below, each connector 16 attaches a handle to an exposed end of a rod.

Figure 3A:
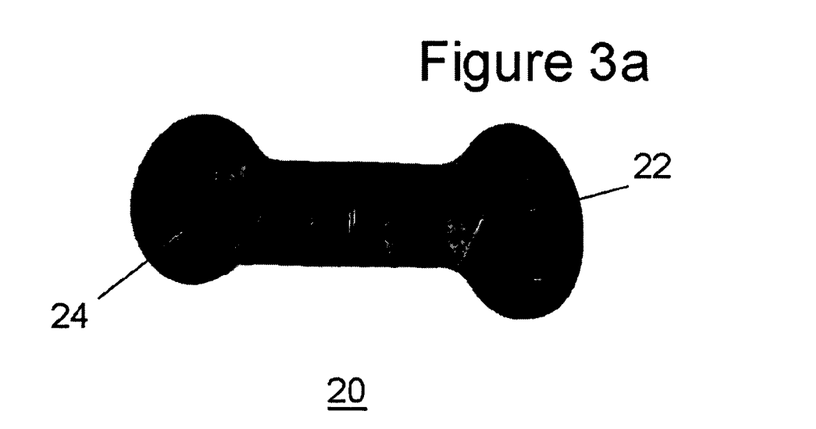
FIGS. 3a, 3b and 3c are schematic illustrations of the connector used to connect the handles to the baking sheet in accordance with the present invention.

The structure of each connector 16 will be described with reference to FIGS. 3a, 3b and 3c of the drawings. As shown in FIG. 3a, each connector (16a, 16b, 16c and 16d shown in FIG. 1) is identified herein, for convenience, as a coupled element 20 (also called connector 20). Coupled element 20 is comprised of two components coupled to one another: connector component 22 and connector component 24 (or simply components 22 and 24). FIG. 3a shows components 22 and 24 coupled together. Components 22 and 24 may be disassembled from one another as further discussed below.

Figure 3B:
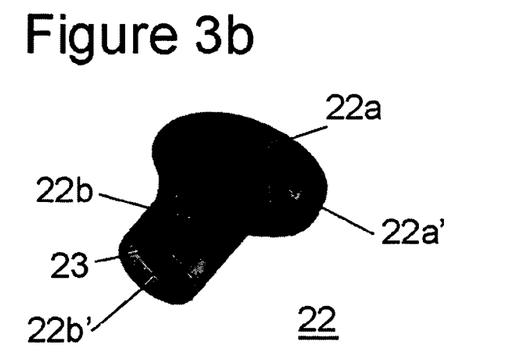
Figure 3C:
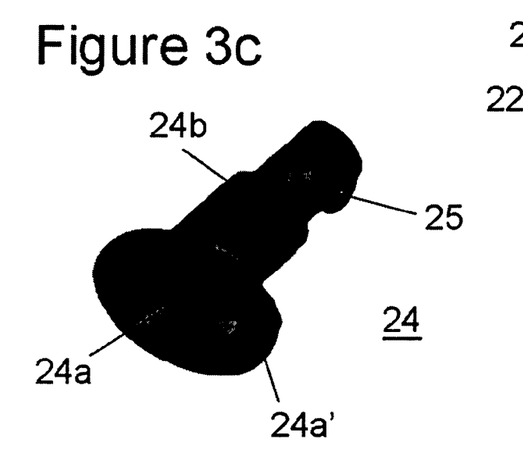

FIG. 3b shows component 22 alone and FIG. 3c shows component 24 alone. As shown in FIG. 3b, component 22 includes connection end 22a and connection end 22b. Connection end 22a (also called rod/handle connection end 22a) includes a round elongated inner core 22a' for receiving an end of one of the rods or an end of one of the handles. Connection end 22b (also called socket end 22b) includes a keyed, mostly round elongated inner core 22b' (with notch 23) and is designed to receive the counterpart connection end of the other connector component 24, discussed below. As shown, the apertures 22a' and 22b' within rod/handle connection end 22a and socket end 22b extend along longitudinal axes that are offset 90 degrees from one another.

Connector component 24 shown alone in FIG. 3c includes connection ends 24a and 24b. Connection end 24a (also called rod/handle connection end 24a) is similar to rod/handle connection end 22a and includes a round elongated inner core 24a' for receiving an end of one of the rods or an end of one of the handles. Connection end 24b (also called plug end 24b) is in the form of a keyed plug (with projection 25) that is designed to be insertable into socket end 22b. Plug end 24b extends outwardly from rod connection end 24a along an axis perpendicular the longitudinal axis of inner core 24a'.

Connector components 22 and 24 are coupled together by inserting plug end 24b of component 24 into socket end 22b of component 22. Since socket end 22b and plug end 24b are "keyed" by means of notch 23 and projection 25, as shown, the components cannot be coupled together in an incorrect manner. That is, the components can only be coupled together to produce the coupled connector configuration shown in FIG. 3a.

Figures 4A, 4B:
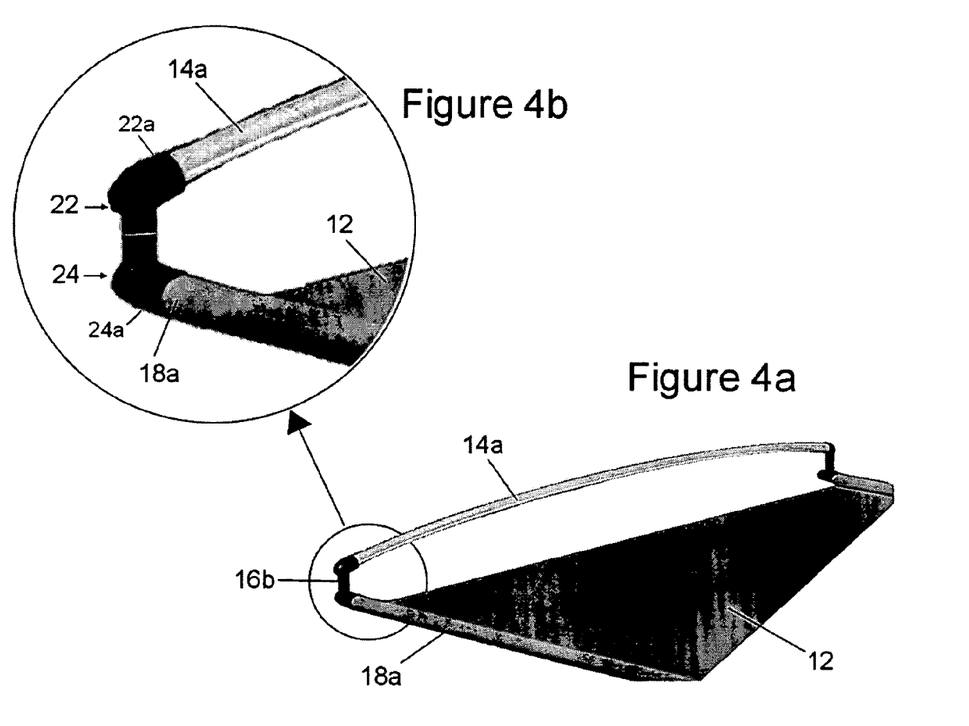
FIG. 4a shows part of the baking sheet of the present invention and FIG. 4b is an enlarged view showing one connector used to connect a handle in accordance with the present invention.

Baking sheet 10 of the present invention utilizes four of the connectors 20 shown in FIG. 3a. As shown in FIG. 1, two connectors (16b and 16c) attach handle 14a to rods 18a and 18b, and two connectors (16a and 16d) attach handle 14b to the other ends of rods 18a and 18b. Referring to FIG. 4a, connector 16b (shown as connector components 22 and 24 in FIG. 4b) connects handle 14a to one end of rod 18a. As described above, connector 16b contains two rod/handle connection ends (22a and 24a) and, in the preferred embodiment, rod/handle connection ends 22a and 24a are reversible, that is, each end can be coupled to an end of a handle and each end can be coupled to a disposed end of a rod. In this preferred embodiment, the dimensions of the ends of both handles 14a and 14b and the ends of both rods 18a and 18b are the same to provide for the versatility of allowing either end of each connector to be coupled to either a handle or a rod. Of course, in a non-preferred embodiment, it is contemplated that the ends of the handles and the rods are of different thicknesses (or other dimensions, as appropriate) and thus connection ends 22a and 24a are designed accordingly and thus may not be interchangeable.

The other three connectors 20 couple respective ends of handles to rods in a like manner as that described above. As would be appreciated, connectors generally are first connected to the handles with the orientations of the longitudinal axes of the exposed inner cores aligned in the same direction before coupling the connectors to the rods. In a preferred embodiment, the dimensions of the handles, rods and inners cores are appropriately sized to enable a user to be able to connect and disconnect the various connections with only a small amount of force. However, the connections should be relatively secure so as to prevent unintended disconnection. For example, gravity alone (i.e., holding the baking sheet in a slanted or vertical orientation) should not cause disconnection of the handles from the rods.

In the preferred embodiment, as further discussed below, a user of the baking sheet 10 of the present invention is able to disassemble the various components for further benefit discussed below. In a non-preferred embodiment, the baking sheet of the present invention is manufactured to produce connections between the handles, connectors and rods that cannot be disassembled by users of the baking sheet.

In accordance with the present invention, the handles can be partially disconnected or fully disconnected from the rods by users of the inventive baking sheet for various beneficial purposes. In particular, after use of the baking sheet 10, one end of each handle 14a, 14b may be disconnected from the respective rods to which they are attached and then the handles may be rotated 90 degrees to place them alongside the longer sides of cooking surface 12 (partial disconnection) (i.e., the axes along which the handles extend are parallel to the axes along which the rods extend). To facilitate such rotation, core 22b' of socket end 22b of each connector (see FIG. 3b) is internally keyed to allow such 90 degree rotation. Since the particular internal design of the connector components to facilitate rotation is well within the capability of one of ordinary skill in the art, further description thereof is not provided. Thereafter, baking sheet 10 may be easily rolled or pushed into storage, as needed. It is appreciated that either end of the two handles may be removed and rotated by users.

To fully disconnect the handles from the cooking surface 12, all of the connectors 16a, 16b, 16c and 16d are removed from the rods to which they are connected. The connectors may then be removed from the attached handles. The connectors themselves may further be dissembled (see FIGS. 3a, 3b, 3c). After disassembly, all of the components may be properly cleaned and stored for later use. Moreover, based upon the intended usage, benefits and preferences of users, multiple variations are possible. For example, various interconnections between the handles and the connectors, or the connectors themselves, may be made permanent during manufacture. That is, the baking sheet of the present invention may be manufactured to allow users to not be able to fully disassemble all of the components, as discussed above. For example, the connectors may be made to prevent their disassembly. For example, the rods and/or handles can be permanently secured to the connectors, e.g., via welding, permanent adhesive or other known technique. In yet another variation, connectors are not utilized, wherein the handles and rods are permanently secured together in any known manner.

As shown in the side view drawing of cooking surface 12 shown in FIG. 2b, rods 18a and 18b are positioned and embedded within the silicone forming cooking surface 12 to provide a cooking surface that has a completely flat lower surface to maximize the area of contact between the cooking surface and an oven grid or plate. In a non-preferred variation, the rods may be maintained below the cooking surface so that only the silicone surrounding the rods contact a flat surface such as a table top after cooking. Moreover, the rods may be coupled to the cooking surface in other manners, such as by co-injection, adhesively secured, welded or other appropriate method. In yet another variation, the baking sheet may be made solely of silicone with a silicone frame provided around the sheet.

Figure 5:
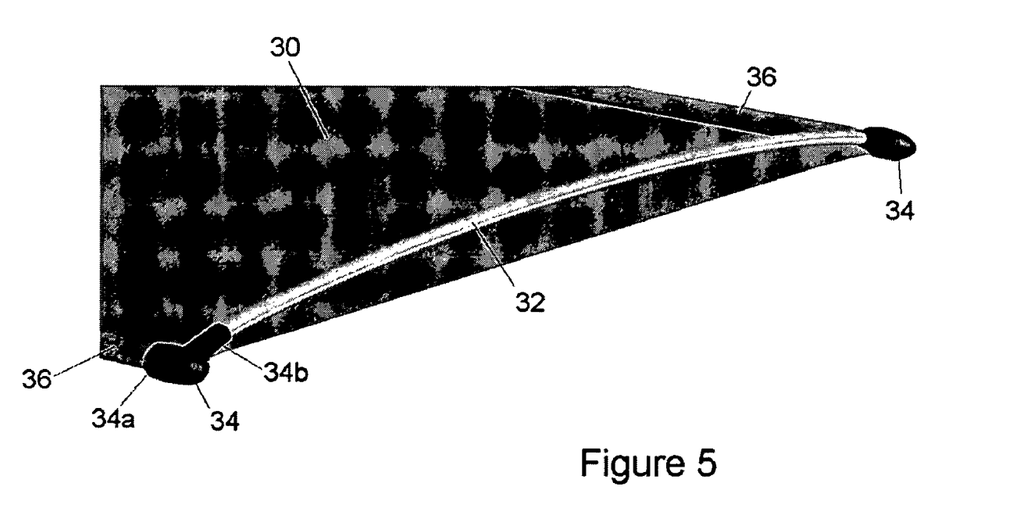
FIG. 5 is a schematic illustration of a portion of another baking sheet in accordance with the present invention.

FIG. 5 of the drawings shows a variation of the baking sheet in accordance with the present invention. Like the embodiment shown in FIGS. 1-4, the baking sheet in FIG. 5 includes a cooking surface 30, a pair of handles 32 (only one handle shown in FIG. 1), four connectors 34 (only two shown in FIG. 5) and a pair of rods 36. Each of these components has the same characteristics and features of the various components previously discussed, and may vary also as previously discussed. The embodiment shown in FIG. 5 differs, however, from the previously described embodiment in that each connector 34 is a single, unitary component with ends 34a and 34b for engagement with a respective end of a rod and a respective end of a handle. Each connector 34 provides for a fixed, that is, non-rotatable, engagement between a handle and rod. Each handle (with or without connectors 34) is removable from the cooking surface during use or storage of the baking sheet. Each handle 32 is curved as shown in FIG. 5 to maximize functionality and aesthetics. However, the curvature or shape of the handle may be different than that shown.

Figure 6A:
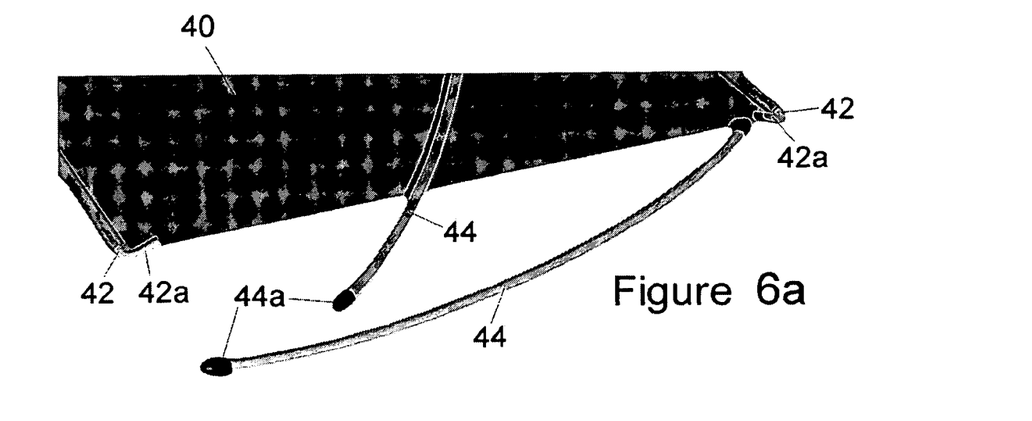
FIGS. 6a, 6b and 6c are schematic illustrations of yet a further baking sheet in accordance with the present invention.
Figure 6B:
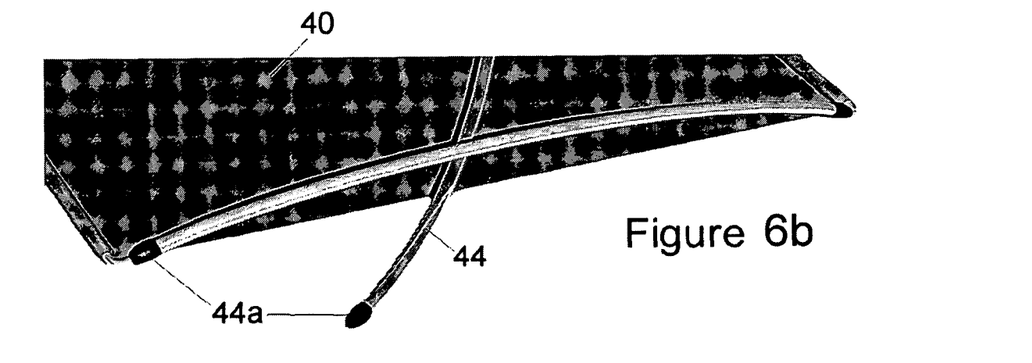
Figure 6C:
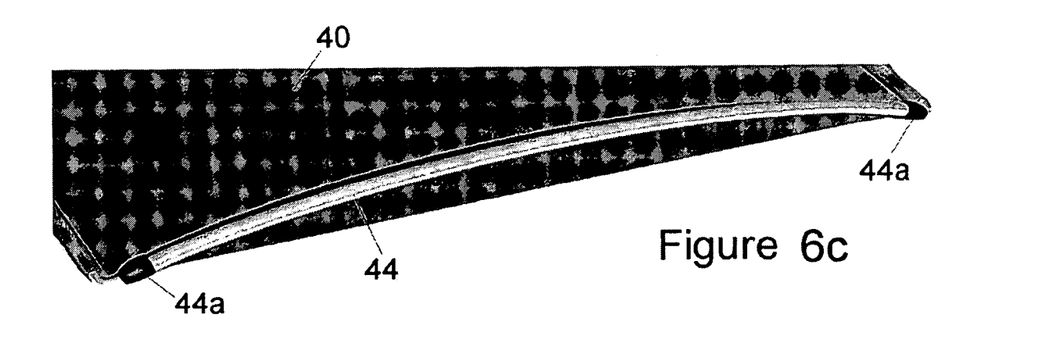

FIGS. 6a, 6b and 6c of the drawings show another variation of the baking sheet of the present invention. The baking sheet shown is similar to the previously discussed variations. However, in this exemplary version, rods 42 disposed within cooking surface 40 include a bent at end 42a (bent at about a 90 degree angle; other angles are possible) utilized for connection with handles 44. Each handle 44 includes an end 44a made of rubber, plastic or other suitable material that receives bent end 42a. As shown, bent ends 42a are directed slightly upwards to enable easy connection to a handle. The handle and rods can be permanently secured to one another, for example, by welding. They also can be detachable. In the version shown, a stable handle construction is provided. In a variation, each handle can include a bent portion for connection to a non-bent end of a rod.

While the present invention has been particularly shown and described in conjunction with preferred embodiments thereof, it will be readily appreciated by those of ordinary skill in the art that various changes may be made without departing from the spirit and scope of the invention. For example, the handles may be attached along the longer surfaces of the baking sheet's cooking surface. As another example, the rods may be positioned along the sheet in a different manner, such as crossed, and additional rods can be utilized, for example, to provide further enhanced support to the baking sheet.

The various dimensions shown may be modified. For example, the baking sheet may have a square cooking surface or other shape. The baking sheet may also have a non-flat structure, and may include waves or other structural design, and/or other textures, on one side or both sides of the baking sheet. In particular, with a non-flat design, different patterns of air circulation are provided. Still further, connectors used to attach the handles to the rods may have designs quite distinct from that shown and described. Moreover, the shapes/cross-sections of the various components may be modified. For example, the handles may have square, rectangular, oval or other appropriate cross-section, with connectors adapted to receive such shaped handles/rods. The rods can be flat, rectangular, square, round, oval, triangular, hexagonal or other appropriate shape. In a further variation, the inventiveness of the baking sheet as discussed is applicable to a serving tray. In such case, the serving tray is similar in appearance to the cooking surface shown in the figures.

As mentioned above, the handles preferably are manufactured from thermo-resistant material. Each of the connectors may be made from any appropriately strong material suitable for cooking applications. The connectors likewise preferably are made from thermo-resistant material. Each of the rods may be made from stainless steel or appropriately strong thermo-resistant material. The handles and rods can be made from the same material, thus providing tension strength to both the frame and sheet. Given the particular design of the baking sheet of the present invention with the preferred thermo-resistant components mentioned, the baking sheet advantageously allows users to make contact with the baking sheet's handles shortly, if not immediately, after exposure of the baking sheet to various cooking temperatures. This advantageous feature in turn allows the removal from an oven or other heat source of the baking sheet using the handles and without the need for the use of oven mitts or other protective device.

The baking sheet of the present invention further provides for a design that enables a user to partially or fully remove the handles. Partially removing the handles, as discussed above, allows the baking sheet to be conveniently slid, moved or rolled into storage when needed. The handles and connectors may also be fully removed to allow for easy cleaning of the various components as well as easy storage. In particular, the baking tray can be stored in close proximity to other baking trays (even those not embodying the present invention) without wasting space needed for the handles. The handles can also be removed prior to baking and then be re-attached to the sheet while it is still in the oven to allow easy "cold-handle" removal of the sheet. The baking sheet therefore may be utilized without the handles and, if desired, handles can be attached to provide easy handling.

In addition, the flexibility of having removable connectors and handles allows for the easy replacement of such components as needed. Handles of various shapes, styles and sizes can be utilized based upon cooking styles, personal preferences and other desires of users. Multiple pairs of handles can be utilized with a single baking sheet, with the user selecting the particular pair of handles to be used based upon whatever factors the user considers. It is further possible to provide different sets of connection ends for the connectors for use with different shaped/sized handles.

Therefore, it is intended that the appended claims be interpreted as including the embodiments described herein, the alternatives mentioned above, and all equivalents thereto.

What is claimed is:

1. A baking sheet, comprising:
a substantially flat cooking surface adapted for direct receipt of food material;
first and second rods coupled to the cooking surface and positioned coplanar to the cooking surface,
the first and second rods being substantially straight along the full length of the cooking surface;
first and second thermo-resistant handles coupled to the first and second rods,
the first and second thermal-resistant handles being slightly curved to provide tensile strength to both the first and second rods and to the cooking surface, and
the tensile strength provided to the cooking surface by the curve of the first and second thermal-resistant handles maintaining a substantial portion of the cooking surface flat and coplanar to the first and second rods.

2. The baking sheet of claim 1, wherein the first and second rods are coupled to opposite ends of the cooking surface, and each of the first and second thermo-resistant handles is coupled to respective ends of the first and second rods.

3. The baking sheet of claim 1, wherein the cooking surface is made from a sheet of a thermo resistant, conductive and food contact safe material selected from the group consisting of plastic and metal.

4. The baking sheet of claim 1, wherein the cooking surface is made of silicone.

5. The baking sheet of claim 4, wherein each of the first and second rods is fully encircled by the silicone cooking surface at respective opposite ends of the silicone cooking surface where said rods come into contact with said cooking sheet.

6. The baking sheet of claim 5, wherein the first and second rods encircled by the silicone cooking surface include exposed ends extending beyond the silicone surface, and the first and second thermo-resistant handles are coupled to the exposed ends of the first and second rods.

7. The baking sheet of claim 1, wherein the first and second rods are made of thermo-resistant material.

8. The baking sheet of claim 1, further comprising a plurality of connectors, each of the connectors connecting a respective end of one of the handles to a respective end of one of the rods.

9. The baking sheet of claim 8, wherein the plurality of connectors are made of thermo-resistant material.

10. The baking sheet of claim 8, wherein each of the plurality of connectors includes detachable first and second connector components.

11. The baking sheet of claim 8, wherein each of the connectors is detachable from the handle and from the rod to which the respective connector is coupled.

12. The baking sheet of claim 8, wherein the plurality of connectors are adapted to secure the first and second handles to the first and second rods, wherein the first and second handles extend along substantially parallel axes that are perpendicular to axes along which the first and second rods extend.

13. The baking sheet of claim 12, wherein the connectors are adapted to rotate to provide each of the first and second handles in positions extending along axes that are substantially parallel to the axes along which the first and second rods extend.

14. A baking sheet, comprising:
a substantially flat silicone cooking surface;
first and second rods extending along and coupled to opposite sides of the cooking surface, the first and second rods being positioned coplanar to the cooking surface and being substantially straight along the full length of the cooking surface;
a first thermo-resistant handle coupled to and extending between the first and second rods; and
a second thermo-resistant handle coupled to and extending between ends of the first and second rods opposite to ends of the first and second rods to which the first thermo-resistant handle is coupled,
the first an second thermal-resistant handles being slightly curved to provide tensile strength to both the first and second rods and to the cooking surface, and
the tensile strength provided to the cooking surface by the curve of the first and second thermal-resistant handles maintaining a substantial portion of the cooking surface flat and coplanar to the first and second rods.

15. The baking sheet of claim 14, further comprising a plurality of thermo-resistant connectors, each of the thermo-resistant connectors connecting a respective end of one of the handles to a respective end of one of the rods.

16. The baking sheet of claim 15, wherein the connectors are selectively detachable from the handle and rod to which they are coupled.

17. The baking sheet of claim 16, wherein the connectors are adapted to rotate to position each of the first and second handles to extend adjacent to one of the rods.

18. A baking sheet, comprising:
a substantially flat cooking surface comprising silicone therethroughout;
first and second rods extending along and coupled to opposite sides of the cooking surface, each of the rods being in receipt of the silicone and being substantially straight along the full length of the cooking surface, the first and second rods being positioned coplanar to the cooking surface,
first and second thermo-resistant handles disposed on opposite ends of the cooking surface and coupled to the first and second rods,
the first and second thermo-resistant handles being slightly curved to provide tensile strength to both the first and second rods and to the cooking surface, and
the tensile strength provided to the cooking surface by the curve of the first and second thermal-resistant handles maintaining the a substantial portion of the cooking surface flat and coplanar to the first and second rods.

19. The baking sheet of claim 18, further comprising one or more additional rods coupled to the cooking surface to provide additional support to the cooking surface.

20. The baking sheet of claim 18, wherein the cooking surface is foldable to provide a foldable tray.

21. The baking sheet of claim 18, wherein the first and second rods are cross-shaped.

22. The baking sheet of claim 18, wherein each of the rods includes a pair of bent ends; the baking sheet further comprising a pair of handles coupled to respective two bent ends of the rods.

23. A baking sheet, comprising:
a silicone body comprising
a perimeter defining a substantially flat cooking surface;
a plurality of rods comprising portions thereof positioned coplanar to the cooking surface;
a plurality of handles connected to portions of the rods,
the plurality of handles being slightly curved to provide tensile strength to both the plurality of rods and to the cooking surface, and
the tensile strength provided to the cooking surface by the curve of the plurality of handles maintaining a substantial portion of the cooking surface flat and coplanar to the plurality of rods.

24. The baking sheet of claim 23, wherein each of the handles and rods comprise the same material.

25. The baking sheet of claim 1, wherein at least a portion of each of the handles is disposed above a plane through which the cooking surface and the first and second rods extend.

26. The baking sheet of claim 25, wherein an entire portion of each of the handles is disposed above the plane through which the cooking surface and the first and second rods extend.

* * * * *